Patented July 4, 1944

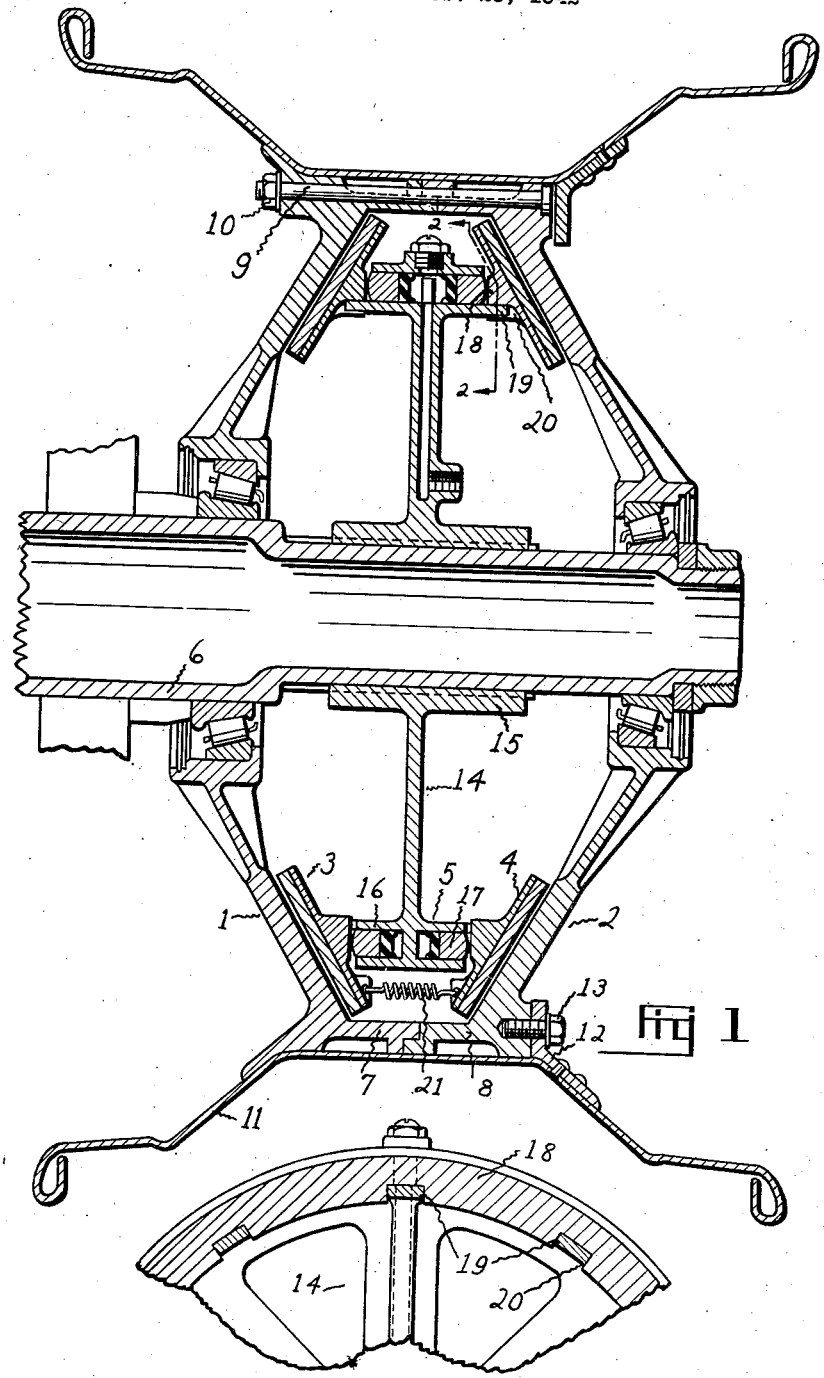

2,352,829

UNITED STATES PATENT OFFICE 2,352,829

WHEEL AND BRAKE ASSEMBLY

Joseph A. Forbes, Detroit, Mich., assignor to Kelsey-Hayes Wheel Company, Detroit, Mich., a corporation of Delaware Application February 23, 1942, Serial No. 432,068

2 Claims. (Cl. 188—152)

The invention relates to wheel and brake assemblies and refers more particularly to assemblies of that type in which the non-rotatable friction members are movable generally axially into braking contact.

The invention has for one of its objects to provide an improved brake which is simple in construction and comprises relatively few parts which may be readily assembled.

The invention has for another object to provide a brake in which the rotatable friction elements form a wheel body for detachably receiving a tire carrying rim.

The invention has for further objects to provide a brake constructed to assure balanced contact pressures between the non-rotatable friction members and their associated rotatable elements; to provide a simple mounting for the non-rotatable friction members; and to provide a simple construction of actuator for the non-rotatable friction members.

With these as well as other objects in view, the invention resides in the novel features of construction and combinations and arrangements of parts as more fully hereinafter set forth.

In the drawing:

Figure 1 is a central section through a wheel and brake assembly embodying the invention;

Figure 2 is a cross section on the line 2—2 of Figure 1.

The wheel and brake assembly is adapted for use with motor vehicles, airplanes, and the like, and comprises the rotatable inboard and outboard disc elements 1 and 2, respectively, the non-rotatable friction members 3 and 4, and the actuator 5 for axially moving the friction members into contact with the internal friction surfaces of the rotatable disc elements.

The inboard and outboard disc elements 1 and 2 are rotatably mounted upon the non-rotatable shaft 6 and are preferably inclined toward each other radially outwardly from their anti-friction mountings on the shaft to provide frusto-conical friction surfaces for contact by the friction members 3 and 4. The non-rotatable disc elements are formed at their peripheries with the rim portions 7 and 8 having internesting edges. 9 are bolts extending axially through the rim portions and 10 are nuts threaded upon the bolts for securing the rim portions and, as a result, the rotatable disc elements together. The rotatable inboard and outboard disc elements form wheel body discs for receiving the tire carrying rim 11. This rim has secured to the outboard side wall of its well the ring 12 which is adapted to be detachably clamped to the outboard disc element 2 by suitable means, such as the nuts 13, to detachably secure the tire carrying rim upon the rim portions of the rotatable disc elements.

14 is a non-rotatable disc element between the rotatable disc elements and having the hub 15 non-rotatably mounted on the shaft 6. The hub, however, is free to move axially of the shaft. The actuator 5 is carried by the non-rotatable disc element and comprises the annular cylinder 16 and the opposed annular pistons 17 within the cylinder. The cylinder is formed integral with the non-rotatable disc element and is concentric with the axis of the shaft 6 and has its opposite ends open. The friction members 3 and 4 are in the nature of annular shoes having annular projections 18 in abutment with the pistons 17 so that when the braking fluid is forced into the cylinder the pistons compel the friction members to move axially into contact with the axially spaced friction surfaces of the inboard and outboard non-rotatable disc elements. To position the friction members radially, the inner wall of the annular cylinder 16 is formed with the angularly spaced end projections 19 which extend axially beyond the outer wall of the cylinder and slidably engage and guide the annular projections 18 of the friction members. To hold the friction members from rotation, the end projections 19 extend into the correspondingly spaced axial slots 20 formed in the radially inner portions of the annular projections 18.

The friction members are resiliently urged toward each other by the series of coil springs 21 having their ends hooked to the friction members radially outwardly of the actuator.

With the above construction, the friction members will have balanced contact pressures with the rotatable disc elements since the pistons of the actuator are of the same size and subject to the same braking fluid pressure. Also, the construction is such that the friction members are supported and held from rotation in a simple manner. Furthermore, that the rotatable disc elements serve as wheel body elements for detachably receiving a tire carrying rim.

What I claim as my invention is:

1. In a wheel and brake assembly, rotatable wheel body elements having axially spaced friction surfaces, a non-rotatable annular cylinder having inner and outer walls with one of said walls having projections at opposite ends extending axially beyond the other of said walls, opposed pistons movable within said cylinder, and friction members extending axially beyond said cylinder and axially slidably supported on and held from rotation by said projections, said friction members being engageable by said pistons and movable into contact with said friction surfaces.

2. In a wheel and brake assembly, rotatable elements having axially spaced friction surfaces, a non-rotatable element between said rotatable elements, an annular cylinder on said non-rotatable element having inner and outer walls with one of said walls having projections, opposed pistons movable within said cylinder and friction members supported by and extending axially beyond said cylinder and held from rotation by said projections, said friction members being engageable by said pistons and movable into contact with said friction surfaces.

JOSEPH A. FORBES.